United States Patent [19]

Kooijmans et al.

[11] 4,317,757
[45] Mar. 2, 1982

[54] WATER-THINNABLE EPOXY RESIN-SULPHANILIC ACID BINDER COMPOSITIONS

[75] Inventors: Petrus G. Kooijmans; Wolfgang Kunze, both of Amsterdam, Netherlands

[73] Assignee: Shell Oil Company, Houston, Tex.

[21] Appl. No.: 212,962

[22] Filed: Dec. 4, 1980

[30] Foreign Application Priority Data

Jan. 25, 1980 [GB] United Kingdom ............... 02542/80

[51] Int. Cl.$^3$ ............................................. C08L 61/28
[52] U.S. Cl. ................................. 524/541; 204/181 R; 528/109; 528/373; 525/510; 525/513; 525/523; 524/540
[58] Field of Search ................... 260/29.2 EP, 29.4 R, 260/29.3; 528/109; 525/513

[56] References Cited

U.S. PATENT DOCUMENTS

| | | | |
|---|---|---|---|
| 2,633,458 | 3/1953 | Shokal | 260/45.2 |
| 2,658,885 | 11/1953 | D'Alelio | 260/53 |
| 2,988,535 | 6/1961 | Feuchtbaum et al. | 528/109 |
| 3,336,241 | 8/1967 | Shokal | 260/2 |
| 3,356,624 | 12/1967 | Neal et al. | 260/18 |
| 3,408,219 | 10/1968 | Neal et al. | 117/37 |
| 3,446,762 | 5/1969 | Lopez | 260/18 |
| 3,637,618 | 1/1972 | May | 260/837 R |
| 4,094,844 | 6/1978 | Allen et al. | 260/29.3 |
| 4,098,744 | 7/1978 | Allen et al. | 260/29.3 |
| 4,119,609 | 10/1978 | Allen et al. | 528/99 |

FOREIGN PATENT DOCUMENTS 54-134759 10/1979 Japan .

*Primary Examiner*—Theodore E. Pertilla
*Attorney, Agent, or Firm*—Norris E. Faringer

[57] ABSTRACT

Water-thinnable, heat curable binders for coatings are prepared by reacting a polyglycidyl ether of a polyhydric phenol with neutralized sulphanilic acid in a ratio of from 0.9 to 1.1 aminohydrogen equivalents per epoxy equivalent.

8 Claims, No Drawings

– 1 –

WATER-THINNABLE EPOXY RESIN-SULPHANILIC ACID BINDER COMPOSITIONS

FIELD OF THE INVENTION

The invention relates to the preparation of water-thinnable, thermosetting binders for coatings, in particular for aqueous can lacquers.

BACKGROUND OF THE INVENTION

Solvent-based can lacquers, containing an epoxy resin and a cross-linking resin such as an aminoplast or phenolic resin are well-known. After application and during the heat-cure the solvent evaporates, and this causing increasing concern in connection with air pollution regulations.

Two methods have been explored to develop a curable water-borne epoxy resin system: first, the epoxy resin ester approach, and second, the emulsion or dispersion approach. In the ester approach the epoxy resin is esterfied with fatty acids and a sufficient amount of free carboxyl groups is taken up in the molecule to ensure, after neutralization, solubility in water. A serious drawback of such technique is that the ester bonds can be hydrolyzed in the water, and this type can therefore have insufficient storage stability.

In the emulsion or dispersion approach the unmodified epoxy resin is emulsified in the water, with the aid of suitable surfactants. The shortcomings of this technique results in the presence of the surfactant, which in the cured coating, will diminish the protective properties, and the application of such coatings with high speed roller coaters is often defective.

Recently, a third method has been proposed, to avoid these defects, the epoxy groups of an epoxy resin are first reacted with the aminohydrogen of para-amino benzoic acid and then the carboxyl functions are neutralized to obtain a water-thinnable resin which can be cross-linked by aminoplast resins at usual baking schedules. See, for example, U.S. Pat. No. 4,094,844, U.S. Pat. No. 4,098,744 and U.S. Pat. No. 4,119,609.

The relatively high price and limited availability of para-amino benzoic acid limits the use of these compositions. Also, the resinous product requires a separate neutralization step.

SUMMARY OF THE INVENTION

The present invention provides a novel one-step process for preparing water-thinnable, hydrolytically stable binders for coatings. The invention is defined as a process for the preparation of water-thinnable curable binders for coatings comprising reacting a polyglycidyl ether of a polyhydric phenol with neutralized sulphanilic acid in a ratio of from 0.9 to 1.1 aminohydrogen equivalents per epoxy equivalent.

DESCRIPTION OF THE PREFERRED EMBODIMENTS

The epoxy resin used to prepare the instant water-thinnable, hydrolytically stable binders comprise those compounds containing at least one vicinal epoxy group; i.e., at least one

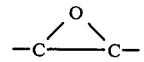

group. These polyepoxides may be saturated or unsaturated, aliphatic, cycloaliphatic, aromatic or heterocyclic and may be substituted if desired with non-interfering substituents such as halogen atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are preferably those having an epoxy equivalency greater than 1.0.

Various examples of liquid polyepoxides that may be used in the process of the invention are given in U.S. Pat. No. 2,633,458 and it is to be understood that so much of the disclosure of that patent relative to examples of polyepoxides is incorporated by reference into this specification.

Other suitable polyepoxides are disclosed in U.S. Pat. No. 3,356,624, U.S. Pat. No. 3,408,219, U.S. Pat. No. 3,446,762, and U.S. Pat. No. 3,637,618 and so much of the disclosure relevant to examples of epoxy compounds is incorporated by reference into this specification.

Other examples of suitable polyepoxides include the glycidyl ethers of novolac resins, i.e., phenol-aldehyde condensates. Preferred resins of this type are those of the formula:

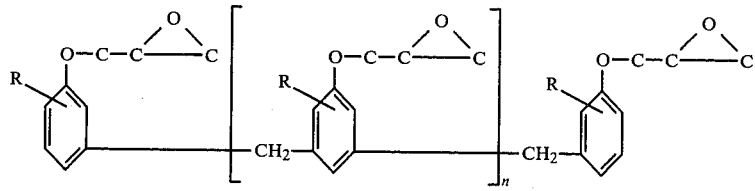

wherein R is hydrogen or an alkyl radical and n is an integer of 1 to about 10. Preparation of these polyepoxides is illustrated in U.S. Pat. No. 2,658,885.

Preferred polyepoxides are the glycidyl polyethers of polyhydric phenols and polyhydric alcohols, especially the glycidyl polyethers of 2,2-bis(4-hydroxyphenyl)propane having an average molecular weight between about 350 and 3,000 and an epoxide equivalent weight between about 170 and 2,000, and preferably between about 350 and 2,000 molecular weight.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., (1) by the hydrogenation of glycidyl polyethers of polyhydric phenols or (2) by the reaction of hydrogenated polyhydric phenols with epichlorohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the hydrogenated phenol is hydrogenated Bisphenol A, the resulting saturated epoxy compound is sometimes referred to as "diepoxidized hydrogenated Bisphenol A", or more properly as the diglycidyl ether of 2,2-bis(4-cyclohexanol) propane.

In any event, the term "saturated epoxy resin", as used herein shall be deemed to mean the glycidyl ethers of polyhydric phenols wherein the aromatic ring structure of the phenols have been or are saturated.

An idealized structural formula representing the preferred saturated epoxy compounds is as follows:

will be applied by electrophoretic deposition whereas tertiary amines can be used for all application methods.

The neutralization is preferably carried out in a rather small amount of a suitable organic solvent such as ether alcohols, as, for example, monomethyl, -ethyl, or -butyl ethers of ethylene glycol or propylene glycol; glycol esters such as ethylene glycol monoacetate or ethylene glycol monoethyl ether monoacetate; ketones, such as methyl ethyl ketone, methyl isobutyl ketone, or cyclohexanone, or mixtures of these solvents. Small amounts of water can also be tolerated. The amount of the solvent is usually not greater than the combined weight of the sulphanilic acid and the neutralizing agent. These solvents in these amounts can usually be tolerated in aqueous coating compositions.

The solvent has several functions. First, it will dissolve the salt of sulphanilic acid. Second, it will moderate the heat of neutralization and assist in keeping the temperature during neutralization under control. Thirdly, it will dissolve the epoxy resin when it is added after the neutralization. Full neutralization of the sulphanilic acid will be required to obtain in an aqueous solution of the final product a pH around 7, but if lower pH is desired a slight reduction in the amount of neutralizating agent may be contemplated. A slight excess of neutralizing agent may also be used.

The neutralization may be carried out at ambient temperature, or preferably at elevated temperature such as up to about 130° C. to accelerate the dissolution of the sulphanilic acid.

The epoxy resin may be added at any time during the neutralization, but is preferably added when the sulphanilic acid (all, or most of it) has been dissolved, and is preferably reacted at temperatures between 100° C. and

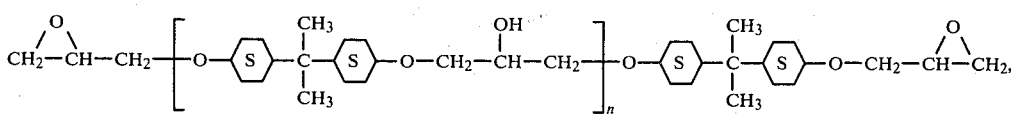

wherein n has a value so that the average molecular weight of the saturated polyepoxide is from about 350 to about 3000. Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-cyclohexanol)propane.

Polyglycidyl ethers which have molecular weights below 500 are also known as liquid epoxy resins, and those with higher molecular weights as solid epoxy resins.

Both types of epoxy resins can be used in the present process, and the selection of epoxy resin will depend on product properties desired, such as inherent acidity, molecular weight, and amount of sulphanilic acid to be used.

The sulphanilic acid, $NH_2-C_6H_4-SO_3H$, can be used in the form of its hydrate. It is first neutralized, preferably with an alkali metal hydroxide, such as sodium hydroxide or potassium hydroxide, with a tertiary amine or with a mixture thereof. Examples of suitable tertiary amines are dimethylethanolamine, diethylethanolamine, triethanolamine; a preferred amine is 2-dimethylamino-2-methyl-1-propanol. Alkali metal hydroxides are suitable when the final water-thinned product 130° C. during a suitable time (usually varying, depending on temperature, from 2 to 7 hours). Completion of reaction can be accertained by determination of epoxy content, or by other suitable means.

The product, a neutralized linear polyaddition compound, is water-thinnable, and an aqueous solution can be made by gradual addition of water to the hot reaction mixture. The solution may be clear, or hazy, or bluish, or may be more of a dispersion.

In the coatings field there is no shartp distinction between water-soluble and water-dispersible, but more a gradual transition. Water-thinnable comprises them all, and the main point is that the product can be diluted readily with water, without assistance of any surfactant or emulsion stabilizer, and still give stable aqueous dilutions.

For making an aqueous baking sytem the product as described above may be diluted with water (preferably deionized water) to produce a system of 10% to 30% w non-volatiles, and then a water-soluble or water-miscible cross-linking resin may be added; alternatively, the cross-linking agent may be added before the dilutions with water. Suitable cross-linking agents are in general urea-formaldehyde resins, melamineformaldehyde resins, and phenolic resins. Very suitable are the various hexamethoxymethyl melamines.

The aqueous system (binder and cross-linking agent) may be applied to a suitable substrate by any suitable means, such as by brush, blade, or roller, by spraying, dipping, or by electrophoretic deposition. The resulting coatings can then be cured by heating at usual temperatures for usual times.

Of course, the conventional paint additives may be used, such as pigments, fillers, plasticizers, thixotropic agents, etc.

The following examples are given to illustrate the preparation and use of the instant water-thinnable binders. It is understood that the examples are embodiments only and are given for the purpose of illustration only and the invention is not to be regarded as limited to any specific components and/or specific conditions recited therein. Unless otherwise indicated, parts and percentages are parts and percentages by weight.

MEK resistance is the number of rubs to be given to the cured coating with a piece of cotton cloth soaked in MEK (methyl ethyl ketone) to soften the surface.

The wedge bend test is for testing suitability as a can coating wherein a coated panel of tin plate is first bent over a 3 mm mandrel and impacted into a wedge shape and then immersed into a $CuSO_4/HCl$ solution for 2 minutes. Any breaks in the film will be stained, and the staining is recorded.

Sterilization resistance was determined by subjecting a coated panel to wet sterilization at 120° C. during 90 minutes (water and 1% w aqueous lactic acid solution), and examinating immediately for cross hatch tape adhesion and blushing.

EXAMPLE I

In a reactor of one liter equipped with stirrer, reflux condensor, and thermocouple were charged: sulphanilic acid.$1H_2O$ (34 g; 0.18 mol), 2-dimethyl-amino-2-methyl-1-propanol (DMAMP) (27 g of 80% w in water; 0.184 mol) and ethylene glycol monoethyl ether (50 g). The mixture was heated to 100° C., and as soon as it was homogeneous and clear, a polyglycidyl ether of 2,2-(4-hydroxyphenyl)propane having an epoxy molecular weight of about 950 and a weight per epoxy (WPE) of 475 (166 g: 0.35 epoxy equivalent) was added, and the temperature kept at 124° C. during 5 hours. After slight cooling, water (420 g) was added gradually. The milky bluish solution had a solid content of 28% w, and was stable, with and without added cross-linking agent (hexamethoxymethyl melamine) during more than 6 months at 40° C.

Hexamethoxymethyl melamine was added to obtain a binder/cross linker weight ratio of 87/13, and the solution was further diluted with water to 24% w solids. This solution was sprayed onto tin plate test panels to obtain a dry film thickness of 5–6 m, and the panels were baked 2–5 minutes at 200° C.

| Evaluation: | MEK resistance: | very good (>100 rubs) |
|---|---|---|
| | wedge bend test: | good |

EXAMPLE II

The procedure of Example I was repeated with the difference that the DMAMP was replaced by 50% w aqueous KOH (20.6 g; 0.184 mol), and the binder crosslinker was diluted with water to 15% w solids. The stability was excellent (more than 6 months at 40° C.).

The solution was applied to tin plate panels by electrophoretic deposition (1 second, 150 V), and the panels were baked as in Example I.

| Evaluation: | MEK resistance: | very good (>100 rubs) |
|---|---|---|
| | wedge bend: | very good |
| | sterilization resistance: | very good. |

EXAMPLE III

The procedure of Example I was repeated with the following compounds and amounts:

| sulphanilic acid . $1H_2O$ | 34 g (0.18 mol) |
|---|---|
| DMAMP 80% w aqueous | 27 g (0.184 mol) |
| ethylene glycol monoethyl ether | 25 g |

Diglycidyl ether of 2,2-bis(4-hydroxyphenyl)propane having an average molecular weight of about 370 and WPE of about 185 (64.5 g; 0.35 epoxy equivalent), water (210 g). The aqueous solution, with hexamethoxymethyl melamine added to give a binder/cross-linker weight ratio 87/13 and diluted with water to a solids content of 15% w, was applied to tin plate panels by electrophoretic deposition (1 second, 150 V), and the panels (coating thickness 5–7 mils) were stoved as in Example I.

The MEK-resistance, wedge/blend, and sterilization resistance were good.

EXAMPLE IV

Example I was repeated, with the exception that the hexamethoxymethyl melamine was replaced by a commercial water-soluble phenolic resin (code number LV 21-408).

The storage stability of the aqueous solution was good, and the coated tin plate panels had good sterilization resistance.

What is claimed is:

1. A water-thinnable, heat curable binder suitable for coatings prepared by reacting a polyglycidyl ether of a polyhydric phenol with neutralized sulphanilic acid in a ratio of from 0.9 to 1.1 aminohydrogen equivalents per epoxy equivalent.

2. The binder of claim 1 wherein the polyglycidyl ether is a polyglycidyl ether of 2,2-bis(4-hydroxyphenyl)propane and has a molecular weight between 350 and 3000.

3. The binder of claim 1 wherein the sulphanilic acid is neutralized with an alkali metal hydroxide and/or a tertiary amine.

4. The binder of claim 3 wherein the tertiary amine is 2-dimethylamino-2-methyl-1-propanol.

5. The binder of claim 3 wherein the alkali metal hydroxide is potassium hydroxide.

6. An aqueous coating composition comprising (a) the binder of claim 1, and (b) a curing amount of a water-miscible cross-linking resin.

7. The coating composition of claim 6 wherein the cross-linking resin is a melamine-formaldehyde resin.

8. The coating composition of claim 7 wherein the melamine-formaldehyde resin is hexamethoxymethyl melamine.

* * * * *